US012635721B2

(12) United States Patent
Borrell et al.

(10) Patent No.: US 12,635,721 B2
(45) Date of Patent: May 26, 2026

(54) CRACKING AND SHELLING MECHANISM FOR NUTS

(71) Applicant: Jose Borrell S.A., Denia (ES)

(72) Inventors: Jose Vicente Roig Borrell, Denia (ES); Francisco Esteban Pastor Martí, Denia (ES)

(73) Assignee: Jose Borrell S.A., Denia (ES)

( * ) Notice: Subject to any disclaimer, the term of this patent is extended or adjusted under 35 U.S.C. 154(b) by 1083 days.

(21) Appl. No.: 17/695,350

(22) Filed: Mar. 15, 2022

(65) Prior Publication Data

US 2022/0287350 A1 Sep. 15, 2022

(30) Foreign Application Priority Data

Mar. 15, 2021 (ES) .................................. 202130220

(51) Int. Cl.
*A23N 5/00* (2006.01)

(52) U.S. Cl.
CPC .................................. *A23N 5/008* (2013.01)

(58) Field of Classification Search
CPC ............ A23N 5/00; A23N 5/008; A47J 43/26
See application file for complete search history.

(56) References Cited

U.S. PATENT DOCUMENTS

| | | | | |
|---|---|---|---|---|
| 1,407,325 A | * | 2/1922 | Coari | A23N 5/00 |
| | | | | 99/549 |
| 3,089,368 A | * | 5/1963 | Cousino | B23D 21/14 |
| | | | | 83/198 |

FOREIGN PATENT DOCUMENTS

| | | | |
|---|---|---|---|
| ES | 2016175 A6 | * | 10/1990 |
| ES | 2803658 A1 | | 1/2021 |

* cited by examiner

*Primary Examiner* — Elizabeth M Kerr
*Assistant Examiner* — Adam M Eckardt
(74) *Attorney, Agent, or Firm* — Farber LLC

(57) ABSTRACT

A cracking and shelling mechanism for nuts is provided with first and second elongated parallel blocks and a seesaw element which moves the blocks. The seesaw element includes a fixed central rotation shaft and rods respectively connected to the central shaft and the first or second block to cause movement of the blocks.

2 Claims, 3 Drawing Sheets

CRACKING AND SHELLING MECHANISM FOR NUTS

FIELD OF THE INVENTION

The present invention belongs to the technical field of nut shelling machines and, in particular, to a nut cracking and shelling mechanism that comprises a plurality of first and second elongated parallel blocks, which alternate with respect to each other, in such a way that between the sides of each first and second blocks a plurality of cracking vertical through holes is defined.

BACKGROUND OF THE INVENTION

Currently, there are several types of cracking and shelling machines for nuts, such as almonds and the like, one of the most efficient being the one which comprises a cracking-shelling mechanism formed by a series of first blocks with an alternating movement in both senses along their longitudinal axis and a series of second blocks, which are fixed, in contrast with the first ones, and arranged in parallel with respect to the first ones and alternating with them.

As time goes by and having studied the obtained results, this machine has been modified and perfected, in order to achieve better results both in terms of the obtained nuts quality, as well as in terms of process efficiency and productivity.

Up until now, many of the accomplished modifications have been focused in changing the size and shape of the through holes, so as to obtain a better cracking of the nuts.

In the particular case of the almonds, there is an increasing presence of new varieties coming from foreign countries, with a more elongated shape and a softer consistency than the native varieties. This generates different behaviours that nuts present in their shelling-cracking processing with these machines, which compel again to study suitable modifications that enhance the results.

Thus, the applicant itself is proprietor of a patent with reference number ES2803658, in which a cracking-shelling mechanism for soft- or hard-shelled nuts is defined, with a plurality of first and second blocks which define a plurality of first and second complimentary offset notches, wherein each first notch is associated to at least one second notch and define a cracking hole with each one. In this case, the first blocks present a longitudinal movement and their movement with respect to the second blocks causes that the holes increase or decrease their size as a result of their position with respect of the corresponding block and of its movement sense.

In the traditional holes, the new almond types, which are more elongated that the native ones, when entering the hole, they perform a rotation which prevents the cracking mechanism acting upon them and cracking them, thus obtaining as a result a great percentage of uncracked nuts, whereas with this hole shape modification the problem is solved, because the particular shape of the notches in the blocks, by virtue of the displacement of the first blocks respect of the second blocks, generates a flattening of the holes, thus allowing the trapping and cracking of the nut and preventing its rotation.

Even though this mechanism solves this problem, the truth is that some aspects to be enhanced keep happening due to the introduction of these new nut varieties. Thus, if a batch contains only the new varieties of more elongated fruits and softer consistency, the result will be satisfactory, but in practice, and ever more often, these new nuts appear mixed with the native nuts, such that the new holes shapes, that benefit the hulling and cracking of the new fruits, tend to cause that the native varieties become trapped or stuck in them, with the resulting inconveniency.

Tests have been carried out to solve this inconveniency, having found that a solution to this problem is to bestow movement upon the second blocks, being this movement alternate and in opposite sense to the first blocks' movement. With this, a greater amplitude range in each hole is obtained, which allows to dislodge any more rounded nuts that might have been stuck.

The applicant itself is proprietor of a utility model, with reference number ES1230938, in which a nuts cracking and shelling machine is defined, which comprises a cracking-shelling mechanism arranged inside sieving means, and which presents a plurality of first and second parallel and alternate blocks, wherein each pair of first consecutive blocks are fastened in their first end by a respective rod to a eccentrically rotating shaft in such a way the they exhibit an alternate movement in both senses along their longitudinal axis.

In this case, although the hole shape is frustoconical and they would not be the ideal for the new nut varieties, in this document it was observed that the option of the second blocks having movement means in their longitudinal axis direction or even in a perpendicular direction was already contemplated. With this, already in this document it was sought to perform the unclogging of nuts stuck in the holes.

However, the thereby proposed solution in the case of the movement in the block's longitudinal axis direction, consists of an element perpendicular thereto, to which the second ends of all second blocks are fastened and with its movement, their own movement is achieved.

This makes it compulsory that the second blocks have the same movement and prevents adjusting of the hole openings in each area.

In this sense, it could be contemplated that each second block be connected through its second end to an eccentrical rod, as it happens with the first blocks, but the fact that a synchronisation of the shafts of the first and second blocks must be obtained, and which also must rotate in opposite senses, makes it very complicated and not at all practical if it is considered that in any given moment the movement range can be adjusted, according to the nuts size, and this would imply a double amount of adjustments, because the adjustments would be needed in the first and in the second blocks rods. On another hand, a mistake or an omission in this adjustment would imply a bad function of the mechanism.

On another hand, the fact of having two motors would complicate the function and would increase the ensemble resonance, its complexity and the process would be more expensive.

It is therefore necessary to solve the existing problem due to the clogging in these mechanisms, caused by being fed with different nut types, particularly almonds, of different sizes, shapes and consistency, with solutions that increase the process efficiency and at the same time be simple to apply and put in practice.

SUMMARY OF THE INVENTION

The cracking and shelling mechanism for nuts, for shelling machines, hereby presented comprises a plurality of first elongated and parallel blocks, with a first end fastened to alternate movement means in both senses along their longitudinal axis and a plurality of second elongated parallel blocks arranged in an adjacent and alternate way to the first blocks.

All these blocks present first and second ends, and two sides, such that between the sides of each first and second block a plurality of vertical cracking through holes are defined.

The movement means of each first block, in this mechanism, comprise a seesaw element connected to at least one pair of blocks formed by said first block and to a second adjacent block, in such a way that the second blocks exhibit a movement, alternate in both senses, along the longitudinal axis thereof, and in opposite sense to the movement of said first adjacent block.

The seesaw element comprises a fixed central rotation shaft, placed at the same height of the first and second blocks, a first rod connected by a first end to the central shaft and by a second end to the first end of the first block by first connecting means or connector, and a second rod connected by a first end to the central shaft, diametrically opposed to the first rod, and by a second end to the first end of the second block, by second connection means or connector, wherein the first and second rods have the same length.

With the hereby proposed cracking and shelling mechanism for nuts, a significant improvement is obtained, with respect of existing mechanisms in the state of the art.

This is so because a mechanism is achieved wherein the movement of the first and also of the second blocks is possible, whereby the holes' aperture and closure motion is increased and this will facilitate that, in the event of clogging of any nut within the holes, the same relative movement of the blocks acts causing unclogging thereof.

Furthermore, the movement means of these first and second blocks, by being connected thereto with a seesaw, are perfectly synchronised and it is not necessary to carry out complex calibration and adjustment procedures, given that synchronisation is assured.

Likewise, any adjustment in the advance of a block, automatically is carried out in the other block associated to the same seesaw, so that the procedure is simple and quick, in which there is no risk of omitting the regulation of any block or to make a mistake in the regulation thereof, because the regulation in one block is associated to all blocks connected to the same seesaw.

By having movement in the first and second blocks we achieve a longer displacement that allows a better soft almonds cracking and at the same time a lesser clogging possibility of the more rounded almonds.

With this, a very efficient cracking and shelling mechanism is obtained for nuts with different varieties, with different features and behaviours, thus achieving a significant increase in productivity.

BRIEF DESCRIPTION OF THE DRAWINGS

In order to aid in a better comprehension of the invention's features, according to a preferred practical embodiment example thereof, it is provided, as integral part of said description, a number of drawings in which, for illustrative and non-limiting purposes, the following has been represented.

DETAILED DESCRIPTION OF THE INVENTION

Figure 1:
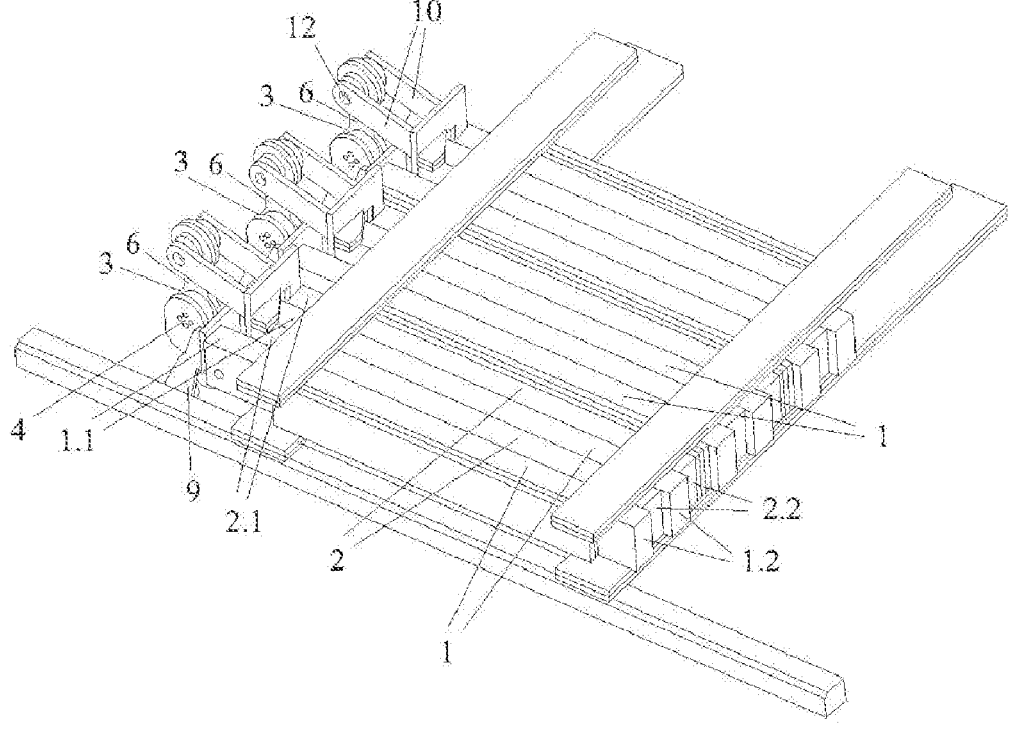
FIG. 1 is a perspective view of the shelling mechanism for nuts, for a preferred embodiment of the invention.

In view of the drawings provided, it can be seen how in a preferred embodiment of the invention, the cracking and shelling mechanism for nuts, for shelling machines, hereby proposed comprises a plurality of first elongated parallel blocks (1) with a first end (1.1) fastened to alternate movement means in both senses along the longitudinal axis thereof and a plurality of second elongated parallel blocks (2) parallel to the first blocks and arranged in an alternate and adjacent way to the first blocks.

Each of these first and second blocks exhibit a first and second ends (1.1, 1.2, 2.1, 2.2) and two sides (8), in such a way that between the sides (8) of each first and second blocks (1, 2) a plurality of vertical cracking through holes (7) is defined.

As shown in FIG. 1, the movement means in each first block (1) comprises a seesaw element (3) which is connected to at least a pair of blocks formed by said first block (1) and to an adjacent second block (2), in such a way that the second blocks (2) exhibit an alternate movement in both senses along their longitudinal axis and in opposite sense to the movement od said adjacent first block (1).

In this preferred embodiment of the invention, as shown in FIG. 1, the seesaw is connected to two pairs of blocks formed by two first and two second blocks (1, 2) adjacent to each other. In other embodiments it can be connected to a different number of blocks or even to a unique first block (1) and to a second block (2) adjacent thereto.

Figure 2:
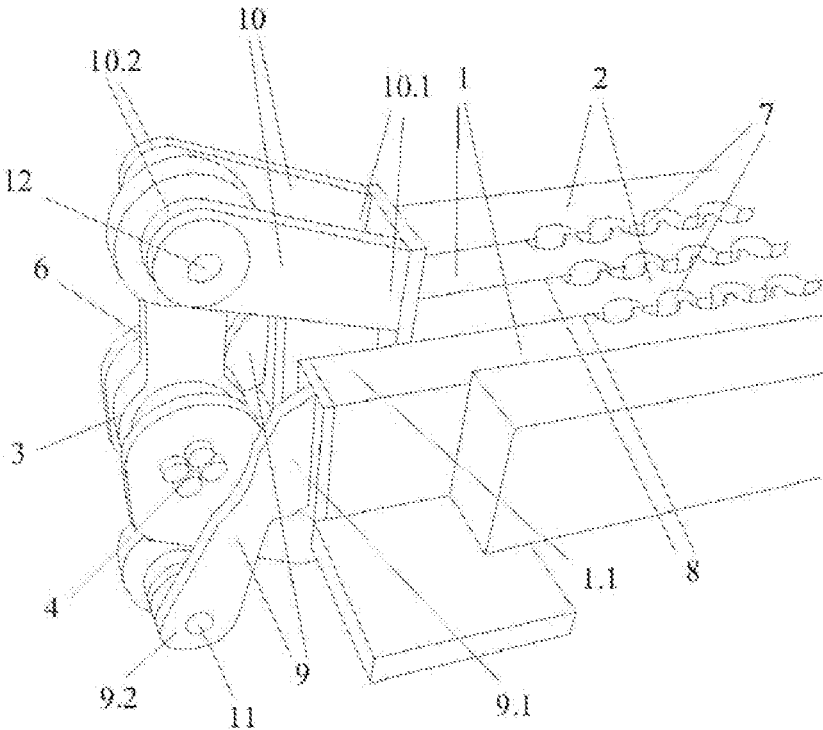
FIG. 2 is a perspective view of a seesaw of the cracking and shelling mechanism for nuts, for a preferred embodiment of the invention.
Figure 3:
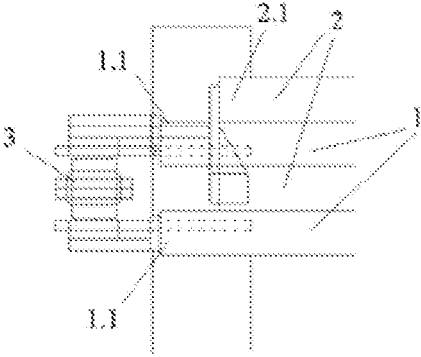
FIG. 3 is a side view of the seesaw of the cracking and shelling mechanism for nuts, for a preferred embodiment of the invention.

This seesaw element (3), as it can be observed in FIGS. 2 and 3, comprises a fixed central rotation shaft (4), placed at the same height than the plurality of first and second blocks (1, 2), a first rod (5) connected by a first end (5.1) to the central shaft (4) and by a second end (5.2) to the first end (1.1) of the two first blocks (1) by first connection means or connectors, and a second rod (6) connected by a first end (6.1) to the central shaft (4), diametrically opposed to the first rod (5), and by a second end (6.2) to the first end (2.1) of the second blocks (2), by second connection means or connectors.

Both, first and second rods (5, 6) exhibit the same length, such that the displacement of each first and second blocks (1, 2) is the same.

In this preferred first embodiment, the first connection means to a first block are formed by a first arm (9), with a first end (9.1) fastened to the first end (1.1) of the first two blocks (1), by a first rotation shaft (11). Since in this case the seesaw is connected to the first two blocks, it exhibits two arms (9), each of them connected to each one of the first arms.

Likewise, the second connection means comprise a second arm (10) with a first end (10.1) fastened to the first end (2.1) of the second blocks (2) and with a second end (10.2) connected to the second end (6.2) of the second rod (6), by a second rotation shaft (12). Since in this case the seesaw is connected to two second blocks, it exhibits two second arms (10), each connected to one of said second arms.

The described embodiment constitutes an example of the present invention, therefore specific details, terms and phrases used in the present specification do not have to be construed as limiting, but have to be interpreted only as a representative basis that provides a comprehensible description, as well as the sufficient information so as to the skilled person in the matter be able perform the present invention.

What is claimed is:

1. A cracking and shelling mechanism for nuts, for shelling machines, that comprises a plurality of first elongated parallel blocks with a first end fastened to alternate movement means in both senses along the longitudinal axis thereof and a plurality of second elongated parallel blocks parallel to the first blocks and arranged in an alternate and adjacent way to the first blocks, wherein all blocks exhibit a first and second ends and two sides, in such a way that between the sides of each first and second blocks a plurality of vertical cracking through holes is defined;

the movement means of each first block comprises a seesaw element which is connected to at least one pair of blocks formed by said first block and an adjacent second block, such that the second blocks exhibit an alternate movement in both senses along the longitudinal axis thereof, and in opposite sense to the movement of said first adjacent block, wherein said seesaw element comprises a fixed central rotation shaft, placed at the same height as the plurality of first and second blocks, a first rod connected by a first end to the central shaft and connected by a second end also to the first end of the first block by a first connector, and a second rod connected by a first end to the central shaft, diametrically opposed to the first rod, and connected by a second end also to the first end of the second blocks, by a second connector, wherein the first and second rods exhibit the same length.

2. The cracking and shelling mechanism for nuts, according to the claim 1, wherein the first connection means to a first block and the second connection means to a second block are formed, in each case, by a first and second arms, wherein the first arm exhibits a first end fastened to the first end of the first block, and a second end connected to the second end of the first rod and, the second arm exhibits a first end connected to the first end of the second block and a second end connected to the second end of the second rod, by a first and second rotation shafts in each case.

* * * * *